United States Patent [19]

Dahlgren et al.

[11] Patent Number: 4,686,105
[45] Date of Patent: Aug. 11, 1987

[54] GRANULAR PRODUCT CONTAINING MAGNESIUM OXIDE AS ITS MAIN CONSTITUENT

[75] Inventors: Sven-Eric Dahlgren, Landskrona; Douglas S. Ekman, Helsingborg; Claes E. Ericsson, Bjuv, all of Sweden

[73] Assignee: Boliden Aktiebolag, Stockholm, Sweden

[21] Appl. No.: 708,396

[22] Filed: Mar. 5, 1985

[30] Foreign Application Priority Data

Mar. 13, 1984 [SE] Sweden ............................ 8401400

[51] Int. Cl.⁴ .......................................... C01B 25/26
[52] U.S. Cl. .................................. 426/74; 423/308; 423/309; 423/311; 426/807
[58] Field of Search ............... 423/308, 309; 426/658, 426/807, 69, 74, 623, 630

[56] References Cited

U.S. PATENT DOCUMENTS

| | | |
|---|---|---|
| 2,508,599 | 4/1950 | Elmslie ............................ 426/807 |
| 3,011,891 | 12/1961 | Locuratolo ....................... 426/807 |
| 3,692,543 | 9/1972 | Powell ............................. 426/658 |
| 3,852,497 | 12/1974 | Skelcey et al. ..................... 426/74 |
| 4,027,043 | 5/1977 | Schroeder et al. .................. 426/74 |
| 4,153,735 | 5/1979 | Mommer ........................... 426/623 |
| 4,160,041 | 7/1979 | Schroeder et al. ................. 426/658 |
| 4,265,916 | 5/1981 | Skoch et al. ...................... 426/630 |
| 4,294,808 | 10/1981 | Wasel-Nielen et al. ............ 423/305 |
| 4,431,675 | 2/1984 | Schroeder et al. .................. 426/74 |
| 4,457,773 | 7/1984 | Sley .................................. 71/33 |
| 4,460,555 | 7/1984 | Thompson ....................... 210/638 |
| 4,542,031 | 9/1985 | Nakajima et al. ................. 426/807 |

FOREIGN PATENT DOCUMENTS

| | | | |
|---|---|---|---|
| 672102 | 1/1966 | Belgium ............................ 426/74 |
| 0004691 | 10/1979 | European Pat. Off. . | |
| 2000791 | 7/1971 | Fed. Rep. of Germany ........ 426/74 |
| 2430267 | 1/1975 | Fed. Rep. of Germany ........ 426/74 |
| 3146857 | 6/1983 | Fed. Rep. of Germany ........ 426/74 |
| 3212325 | 10/1983 | Fed. Rep. of Germany ........ 426/74 |
| 2145010 | 2/1973 | France .............................. 426/74 |
| 6809505 | 1/1979 | Sweden . | |
| 994458 | 2/1983 | U.S.S.R. ............................ 426/74 |

Primary Examiner—John Doll
Assistant Examiner—Wayne A. Langel
Attorney, Agent, or Firm—Burns, Doane, Swecker & Mathis

[57] ABSTRACT

The present invention relates to a granular product comprising a reaction product between magnesium oxide and phosphoric acid; this product exhibiting high solubility in neutral citrate solubility tests and the weight ratio of magnesium to phoshorous being smaller than 1.8:1.

3 Claims, 1 Drawing Figure

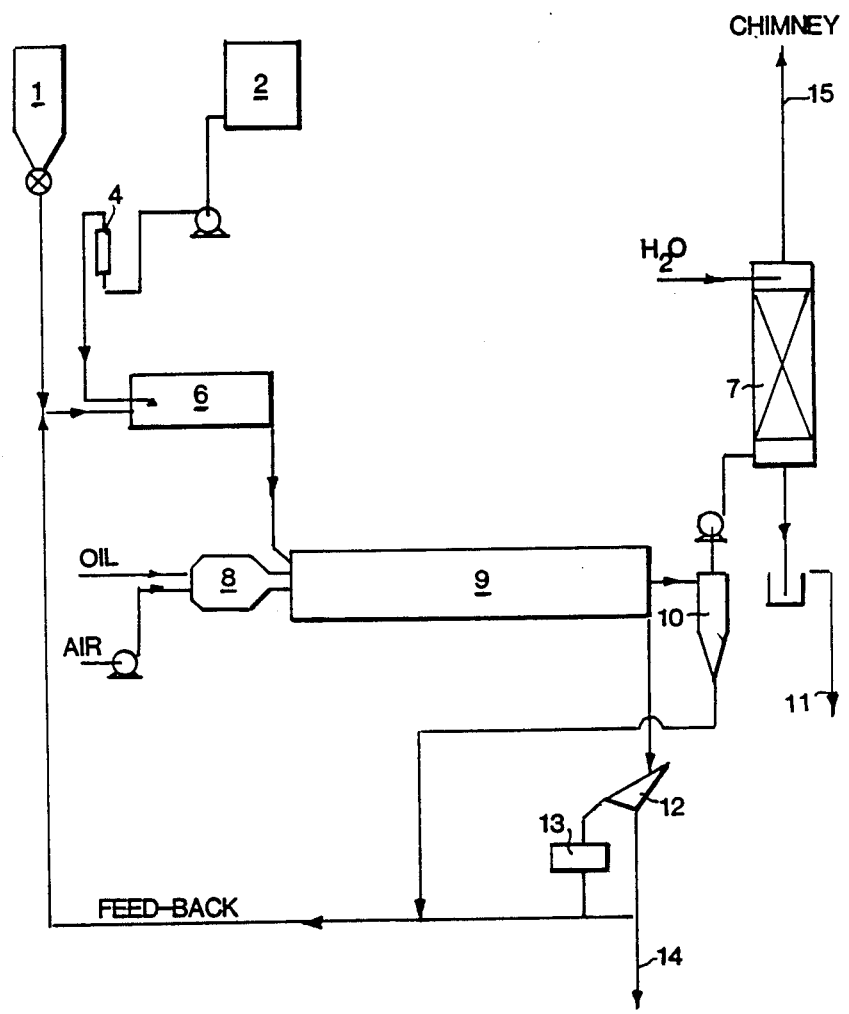
FIG

GRANULAR PRODUCT CONTAINING MAGNESIUM OXIDE AS ITS MAIN CONSTITUENT

DESCRIPTION

1. Technical Field

The present invention relates to a magnesium-oxide based granular products suitable as an ingredient in mineral feed mixtures.

The object of the present invention is to produce a magnesium-phosphorous product which is highly soluble in the so-called neutral citrate solubility test. The test shows the biological availability of a product.

2. Background Art

It is known to add magnesium oxide to mineral feed mixtures, normally in powder or compressed form. The fine magnesium oxide is highly dust creating, however, and is consequently less attractive than the compressed or agglomerate form, among other things from the aspect of handling the same. Feeding tests carried out on animals using mineral feed in both powder and granular form have also shown that animals prefer a mineral feed presented in granular form. The flavour of the feed can also be improved by adding certain chemicals. One decisive drawback with the granular substance is the difficulty in maintaining a homogenous mixture subsequent to admixing the substance with mineral feed mixtures. If powderous magnesium oxide is mixed with granular mineral feed and there is not sufficient magnesium oxide to fill all the voids presented by the mineral feed, the two substances will segregate (de-mix), which is both troublesome and of course, undesirable. Segregation is difficult to prevent even when using the aforesaid compressed product, due to the difficulty in regulating and varying the grain-size distribution thereof. Consequently, in order to prevent segregation of this nature, it is necessary for the grain-size of the magnesium oxide to correspond substantially with the grain-size of the main ingredient of the mineral feed. Since the latter is normally retailed in granular form, it is naturally desirable for the magnesium oxide also to be available in granular form and in a grain-size and shape which lies close to the grain-size and shape of the main constituent of the mineral feed.

When granulated with phosphoric acid in accordance with methods known hitherto, the majority of magnesium oxides produce a product which resembles popcorn. It is not possible to control the grain-size distribution of this product, however, and neither is the product sufficiently stable when handled and stored. The resultant products have also been found less attractive by the animals to which they were fed, and consequently it has been necessary to add flavour-enhancing substances to such products. These additives are often in the form of products of molasses, which has the deleterious effect of exposing the product to the effects of bacteria and fungii, particularly when the product is used in animal feed mixtures.

When granulating magnesium oxide with hydrochloric acid or chlorides or mixtures thereof in accordance with known techniques, there is prepared a slurry or porridge of magnesium oxide in hydrochloric acid and/or chloride solution. The slurry is then allowed to solidify while forming oxide chlorides, which function as binding agents, and the solidified product can then be crushed and sieved. The above mentioned techniques are greatly dependent on the extent to which the magnesium oxide is able to react, which restricts its use.

There is described in No. SE-C-6813135-8 (Publication No. 384,358) a method which enables grain-size distribution to be controlled and adjusted as required, by particular adaptation of the process conditions. In this regard, the method can be carried out continuously, which is highly beneficial with regard to economy. Grain-size distribution is extremely important, when the product is to form an ingredient in animal feed mixtures. The products obtained have also been found by the animals to which they were fed to have more flavour. As before mentioned, animals prefer granular feed. This more pronounced flavour, however, is also greatly due to the additional flavour-enhancing substances, these substances also functioning as a binder in the granulating process. The additives are controlled so that no complications will arise during storage of the products, either when stored alone or in mixture in arbitrary proportions with other feed ingredients.

In principle, the product is manufactured by reacting a starting material, constituting a first reactant and comprising mainly magnesium oxide, with a material constituting a second reactant and chosen from the group comprising phosphoric acid, hydrochloric acid and a solution of magnesium chloride. The reaction takes place in a granulator and is effected by either spraying the second reactant on a pre-mix of recycled material and starting material, or by spraying a pre-mix of starting material and the second reactant onto the recycled or return material. The resultant product is then dried and sieved, wherewith part of the product is taken-out as a finished, granular product and the remainder is recycled to the process as return material, subsequent to crushing the larger agglomerates present in said return material.

For granulation there can be used phosphoric acid and/or hydrochloric acid, which is, or are, sprayed onto the mixture present in the granulator. As before indicated, instead of supplying magnesium oxide and acids separately, they can be mixed together and the resultant mixture sprayed onto the return material present in the granulator, this return material having completed its reaction. The hydrochloric acid and the phosphoric acid are intended to react with the magnesium oxide in a manner to form reaction products which function to some degree as binding agents during the subsequent granulating process. Tests have shown that granules produced when adding excessively weak acids, or simply plain water, will disintegrate when dry, or are extremely weak. Consequently, in order to produce granules of sufficient strength and stability it is essential that phosphoric acid and/or hydrochloric acid is, or are, added in such quantities that the final product has a phosphorous pentoxide ($P_2O_5$) content in excess of about 15% ($P > 6.5\%$). Thus, the amount of return material present in relation to the amount of material newly formed shall be large enough to achieve satisfactory granulation. The quantative ratio between return material and newly formed product should exceed 1 (one) and should suitably lie between 3 and 25, depending upon firstly the grain-size distribution of the return material, secondly the grain-size distribution desired in the end product, and thirdly the concentration of the acid or salt solution used. For example, when a coarse-grain return material is used a coarse-grain product will be obtained when a highly concentrated acid is used and the return ratio is low. Conversely, a fine-grain product is obtained when using a fine-grain return material, low acid concentrations and a high return ratio.

Products manufactured in accordance with No. SE-C-6813135-8 have been found to have relatively low solubility in the neutral citrate solubility test. In this respect it has been found that the solubility of magnesium in the neutral citrate solubility test is only about 7% or less. However, in order to utilize the magnesium source to the maximum when used as a mineral feed ingredient it is desirable to greatly increase its solubility. Consequently, citrate solubility values of about 95% and more are sought for.

DESCRIPTION OF THE PRESENT INVENTION

It has now surprisingly been found possible to increase this solubility value to the desired level by changing the ratio of magnesium to phosphorous. The product is characterized in that the ratio of phosphorous is less than 1.8, suitably less than 1.7 and preferably from 1.5–1.65.

Other characterizing features of the invention are set forth in the following claims.

The product can be produced in accordance with the method described in No. SE-C-6813135-8. The ratio of magnesium to phosphorous in products described in No. SE-C-6813135-8 is 2.2–6.4.

The invention will now be described in more detail with reference to a number of working examples.

EXAMPLE 1–3

Ground calcined magnesite containing 40% magnesium was introduced into a laboratory apparatus comprising a rotatable open drum, together with phosphoric acid which had been cleansed of fluorine and which contained 42% phosphorous pentoxide. The magnesite was pre-heated to 60° C. The phosphoric acid was charged in an amount corresponding to a weight ratio of magnesium to phosphorous of 1.5, 2.0 and 2.5 respectively. The mixture was readily granulated, although the product having the magnesium to phosphorous weight ratio of 1.5 became slightly viscous due to the larger amount of phosphoric acid present. In production, this stickness was eliminated by returning undersize grains and/or crushed oversize material to the process.

The products were analysed in accordance with the neutral citrate solubility test wherewith the results set forth in Table I were obtained.

TABLE I

| Example | Weight Ratio Mg:P | $Mg_{tot}$ % | $P_{tot}$ % | Mg, neutral citrate % | Relative value neutral citrate Mg, % |
|---|---|---|---|---|---|
| 1 | 1.5 | 25.2 | 13.4 | 24.9 | 98.8 |
| 2 | 2.0 | 29.5 | 10.9 | 25.4 | 86.1 |
| 3 | 2.5 | 30.3 | 9.6 | 17.8 | 58.7 |

EXAMPLE 4–6

Tests were carried out in the plant illustrated schematically in the single FIGURE of the accompanying drawing. This plant comprised a hopper, equipped with a magnesium-oxide cell feeder 1, a phosphoric-acid tank 2 equipped with a metering pump and flow meter 4, a granulating drum 6, a drying drum 9 with associated combustion chamber 8, a vibration screen 12 comprising screens with 1.5 and 0.5 mm mesh openings, a crusher 13, and means 14 for removing the product from the system. The plant also contained gas cleansing equipment, including a cyclone 10 having connected thereto a discharge valve and a dust screw-conveyor, a waste-gas fan and scrubber 7 having a liquid lock and discharge 11 and means connecting the scrubber to a smoke stack or chimney 15. The plant was also provided with the necessary transport means for recycling return material from the terminal station of the plant to the granulating drum 6. The plant was designed for continuous operation. In this context the starting material used was calcined magnesite containing 40% magnesium, and phosphoric acid which had been cleansed of fluorine and which contained 42% phosphorous pentoxide. The ratio of incoming magnesite:return material was 1:5.

Products comprising different ratios of magnesium to potassium were produced in this way. The neutral solubility of the products is given in Table II below.

TABLE II

| Example | Weight Ratio Mg:P | $Mg_{tot}$ % | $P_{tot}$ % | Mg, neutral citrate % | Relative value neutral citrate Mg, % |
|---|---|---|---|---|---|
| 4 | 1.67 | 23.1 | 13.8 | 22.8 | 98.7 |
| 5 | 1.73 | 24.7 | 14.3 | 24.1 | 97.5 |
| 6 | 1.82 | 24.0 | 13.2 | 23.3 | 97.1 |

The reason why the values for magnesium neutral citrate solubility in Example 4 are slightly lower than the corresponding values in the other Examples is because a higher drying temperature prevailed in the plant during the test represented by this Example.

We claim:

1. A granular mineral feed product for animals consisting essentially of the reaction product between magnesium oxide and phosphoric acid, said granular product having neutral citrate solubility test relative value of at least about 95% and having a weight ratio of magnesium to phosphorus in the range of 1.5 to 1.8.

2. The granular product of claim 1 wherein the weight ratio of magnesium to phosphorus is less than 1.7.

3. The granular product of claim 2 wherein the weight ratio of magnesium to phosphorus is in the range of 1.5 to 1.65.

* * * * *